(12) United States Patent
Miyata

(10) Patent No.: US 8,638,463 B2
(45) Date of Patent: Jan. 28, 2014

(54) COMMUNICATION CONTROLLING METHOD, COMPUTER READABLE MEDIUM, AND COMMUNICATION DEVICE

(75) Inventor: Yuji Miyata, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 143 days.

(21) Appl. No.: 13/170,651

(22) Filed: Jun. 28, 2011

(65) Prior Publication Data

US 2012/0026538 A1   Feb. 2, 2012

(30) Foreign Application Priority Data

Jul. 29, 2010 (JP) ................................ 2010-170703

(51) Int. Cl.
*H04M 1/00* (2006.01)

(52) U.S. Cl.
USPC ........................................ 358/1.15; 455/557

(58) Field of Classification Search
USPC .................. 455/41.3, 551, 557, 556.1, 552.1; 358/1.15
See application file for complete search history.

(56) References Cited

U.S. PATENT DOCUMENTS

| 7,286,251 | B2 | 10/2007 | Tomida et al. | |
|---|---|---|---|---|
| 7,616,337 | B2 | 11/2009 | Hayashi | |
| 7,657,282 | B2 | 2/2010 | Suzuki et al. | |
| 8,085,422 | B2 * | 12/2011 | Morita | 358/1.15 |
| 2002/0054345 | A1 | 5/2002 | Tomida et al. | |
| 2002/0065873 | A1 | 5/2002 | Ishizuka | |
| 2004/0184073 | A1 | 9/2004 | Shahindoust | |
| 2004/0184100 | A1 | 9/2004 | Shahindoust | |
| 2004/0204038 | A1 | 10/2004 | Suzuki et al. | |
| 2006/0234762 | A1 * | 10/2006 | Ozluturk | 455/552.1 |
| 2007/0167187 | A1 | 7/2007 | Rezvani et al. | |
| 2008/0004075 | A1 | 1/2008 | Horton | |
| 2008/0310324 | A1 * | 12/2008 | Chaponniere | 370/254 |

(Continued)

FOREIGN PATENT DOCUMENTS

| CN | 101267370 A | 9/2008 |
|---|---|---|
| CN | 101345999 A | 1/2009 |

(Continued)

OTHER PUBLICATIONS

U.S. Office Action dated Aug. 2, 2012, received in related U.S. Appl. No. 13/170,656.

(Continued)

*Primary Examiner* — Kent Chang
*Assistant Examiner* — Nelson Rosario
(74) *Attorney, Agent, or Firm* — Scully, Scott, Murphy & Presser, P.C.

(57) ABSTRACT

A method to control a communication device to communicate with a first external device in a first communication method and with a second external device in a second communication method is provided. The method includes steps of determining prior to communicating in the first communication method whether the communication device is under an ongoing communication session in the second communication method, executing one of switching the communication methods in the communication device from the second communication method to the first communication method when the communication device is not under any ongoing communication session in the second communication method and maintaining the second communication method set in the communication device when the communication device is under an ongoing communication session, and communicating with the first external device in the first communication method after switching the communication methods from the second communication method to the first communication method.

7 Claims, 7 Drawing Sheets

(56) References Cited

U.S. PATENT DOCUMENTS

| | | |
|---|---|---|
| 2010/0309504 A1 | 12/2010 | Partridge et al. |
| 2011/0063663 A1 | 3/2011 | Kim et al. |
| 2011/0212746 A1 | 9/2011 | Sarkar et al. |
| 2011/0216349 A1 | 9/2011 | McCorkindale et al. |
| 2011/0319072 A1* | 12/2011 | Ekici et al. .................. 455/426.1 |

FOREIGN PATENT DOCUMENTS

| | | |
|---|---|---|
| CN | 101572926 A | 11/2009 |
| JP | 2001-36937 | 2/2001 |
| JP | 2002-175163 | 6/2002 |
| JP | 2002-175226 | 6/2002 |
| JP | 2004-180225 | 6/2004 |
| JP | 2004-334837 | 11/2004 |
| JP | 2004-172882 | 6/2007 |
| JP | 2007-306510 | 11/2007 |
| JP | 2008-67184 | 3/2008 |
| JP | 2008-252894 | 10/2008 |
| JP | 2008-271400 | 11/2008 |
| JP | 2008-271800 | 11/2008 |

OTHER PUBLICATIONS

Decision of Rejection dated Sep. 11, 2012 received from the Japanese Patent Office from related Japanese Application No. 2010-170703, together with an English-language translation.

Notification of Reasons for Rejection dated Apr. 17, 2012 received from the Japanese Patent Office from related Japanese Application No. 2010-167162 and U.S. Appl. No. 13/170,656, together with an English-language translation.

Final U.S. Office Action dated Apr. 2, 2012 received in related U.S. Appl. No. 13/170,656.

U.S. Office Action dated Dec. 12, 2011 received in related U.S. Appl. No. 13/170,656.

Notification of Reasons for Rejection dated Jun. 12, 2012 received from the Japanese Patent Office from related Japanese Application No. 2010-170703, together with an English-language translation.

Chinese Official Action dated Sep. 4, 2013 received in related application CN 201110173932.2.

Chinese Official Action dated Oct. 30, 2013 received in related application CN 201110204549.9.

* cited by examiner

COMMUNICATION CONTROLLING METHOD, COMPUTER READABLE MEDIUM, AND COMMUNICATION DEVICE

CROSS REFERENCE TO RELATED APPLICATION

This application claims priority from Japanese Patent Applications No. 2010-170703, filed on Jul. 29, 2010, the entire subject matters of which are incorporated herein by reference.

BACKGROUND

1. Technical Field

An aspect of the present invention relates to a method to control a communication device, which can communicate with other devices in two or more different communication technologies.

2. Related Art

A communication system having a printer and a mobile communication device is known. The mobile device may transmit printable data to the printer via a wide area network (WAN), and the printer may print an image according to the printable data received from the mobile device.

SUMMARY

In the communication system, the communication device may support a plurality of communication methods and selectively use one of the methods to communicate with an external device depending on various communication conditions, such as a communication task and a type of the external device. In this regard, although the communication device may communicate with an external device in one of the communication methods and with another external device in another one of the communication methods, the communication device may not necessarily be enabled to establish communication with the plurality of external devices in the different communication methods in parallel simultaneously. Rather, in many cases, the communication device is allowed to communicate with solely one of the external devices in one of the communication methods at a time. Therefore, when the communication device communicating with one external device is required to communicate with another external device, a user of the communication device is required to manually switch the communication settings in the communication device.

When the communication settings in the communication device are switched from a first communication method to a second communication method whilst one preceding communication session in the first communication method is in progress, the preceding communication may be interrupted. Therefore, when the communication settings are switched back from the second communication method to the first communication method, the interrupted communication session may not be resumed but aborted. When the preceding communication session is aborted, for example, information inputted in the communication device during the preceding communication session may be lost.

In view of the above deficiency, whilst the interrupted and not-resumed communication session may cause the inconvenience, the present invention is advantageous in that a method to prevent or moderate the inconvenience.

According to an aspect of the present invention, a method to control a communication device to communicate with a first external device in a first communication method and with a second external device in a second communication method being different from the first communication method is provided. The method include steps of determining prior to communicating in the first communication method whether the communication device is under an ongoing communication session in the second communication method with the second external device, executing one of switching the communication methods in the communication device from the second communication method to the first communication method when it is determined that the communication device is not under any ongoing communication session in the second communication method and maintaining the second communication method set in the communication device when it is determined that the communication device is under an ongoing communication session, and communicating with the first external device in the first communication method after switching the communication methods from the second communication method to the first communication method.

According to another aspect of the present invention, a non-transitory computer readable medium storing computer readable instructions to control a communication device, which is capable of communicating with a first external device in a first communication method and with a second external device in a second communication method being different from the first communication method, is provided. The computer readable instructions controls the communication device to execute steps of determining prior to communicating in the first communication method whether the communication device is under an ongoing communication session in the second communication method with the second external device, executing one of switching the communication methods in the communication device from the second communication method to the first communication method when it is determined that the communication device is not under any ongoing communication session in the second communication method and maintaining the second communication method set in the communication device when it is determined that the communication device is under an ongoing communication session, and communicating with the first external device in the first communication method after switching the communication methods from the second communication method to the first communication method.

According to another aspect of the present invention, a communication device, which is capable of communicating with a first external device in a first communication method and with a second external device in a second communication method being different from the first communication method, is provided. The communication device includes a determining unit, which is configured to determine prior to communicating in the first communication method whether the communication device is under an ongoing communication session in the second communication method with the second external device, an executing unit, which is configured to execute one of switching the communication methods in the communication device from the second communication method to the first communication method when it is determined that the communication device is not under any ongoing communication session in the second communication method and maintaining the second communication method set in the communication device when it is determined that the communication device is under an ongoing communication session, and a communicating unit, which is configured to communicate with the first external device in the first communication method after switching the communication methods from the second communication method to the first communication method.

BRIEF DESCRIPTION OF THE ACCOMPANYING DRAWINGS

DETAILED DESCRIPTION

Figure 1:
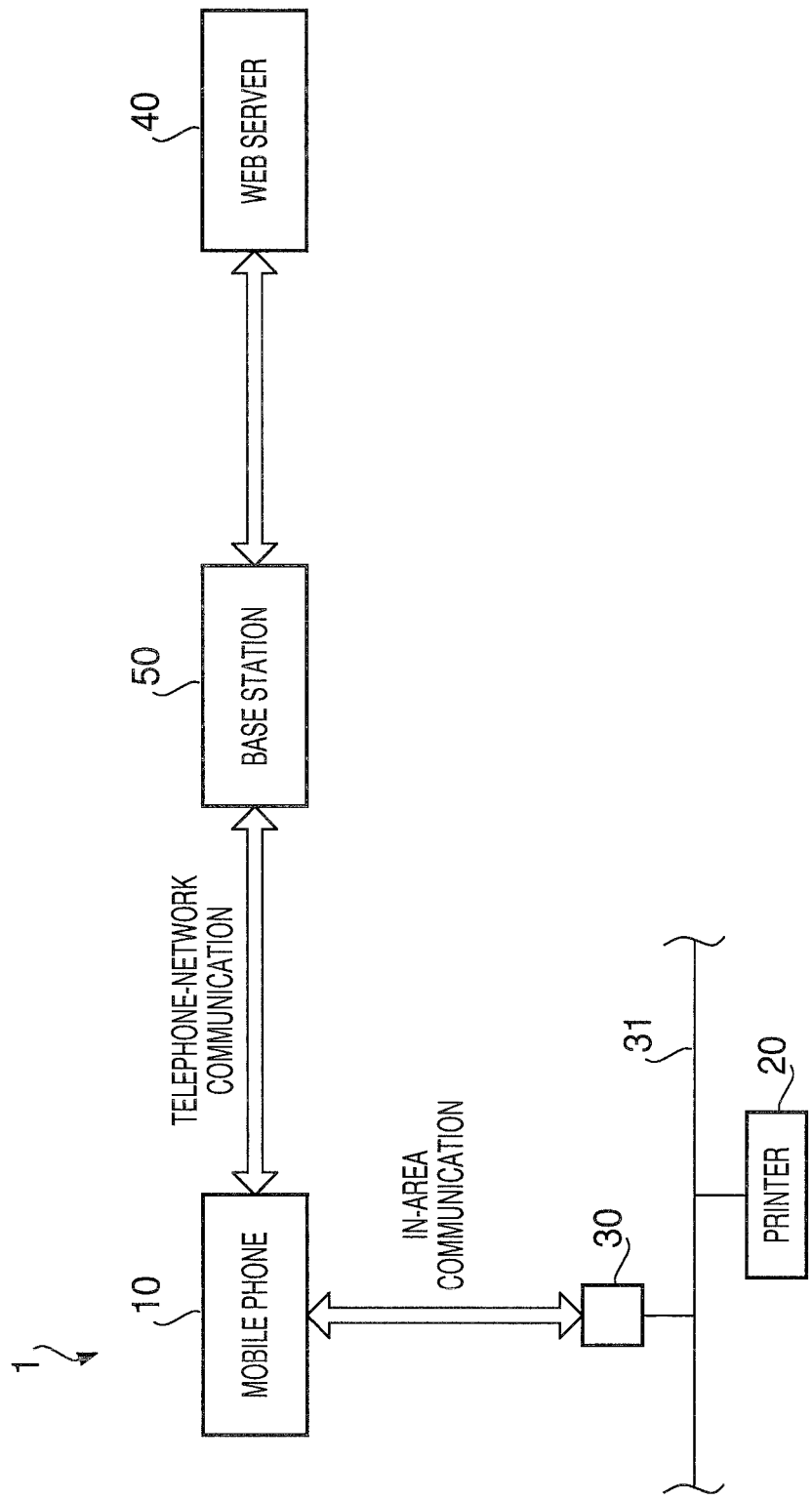
FIG. 1 is a diagram to illustrate a communication system having a mobile phone and external devices according to an embodiment of the present invention.

Hereinafter, embodiments of the present invention will be described with reference to the accompanying drawings. The following description includes a first embodiment and a second embodiment of the present invention. Firstly, an overall configuration of a communication system 1 according to the first embodiment will be described with reference to FIG. 1. The communication system 1 according to the first embodiment includes a mobile phone 10, a printer 20, and a web server 40.

The mobile phone 10 is equipped with a telephone-calling function, which enables a user of the mobile phone 10 to speak with a different telephone user on the other end of line, and a wireless data-exchange function, which enables the mobile phone 10 to exchange data wirelessly with a different device. The wireless data exchange with the different device can be conducted in one of a plurality of different communication methods. Therefore, for example, the mobile phone 10 is wirelessly connectable with the printer 20 in one communication method and with the web server 40 in a different communication method. According to the present embodiment, the mobile phone 10 communicates with the printer in in-area communication and with the web server 40 in telephone-network communication.

The in-area communication is a data communication method to connect different network-enabled devices exclusively within a specific coverage area and includes, for example, Wi-Fi, Bluetooth, infrared wireless communication (IrDA), and LAN (local area network).

The telephone-network communication is a communication method to use a telephone line for the mobile phone 10 and includes, for example, WCDMA (wideband code division multiple access). The mobile phone 10 is capable of communicate with the device (e.g., the web server 40) outside the specific coverage area via a base station 50 by using the telephone-network communication.

When the mobile phone 10 is set to communicate in in-area communication, the mobile phone 10 cannot communicate with a device (e.g., the web server 40) outside the coverage area. However, the mobile phone 10 may communicate with the device outside the coverage area (e.g., the web server 40) when the in-area device (e.g., the printer 20) being connected with the mobile phone 10 is connectable with PSTN (public switched telephone network) (e.g., the Internet).

Figure 2:
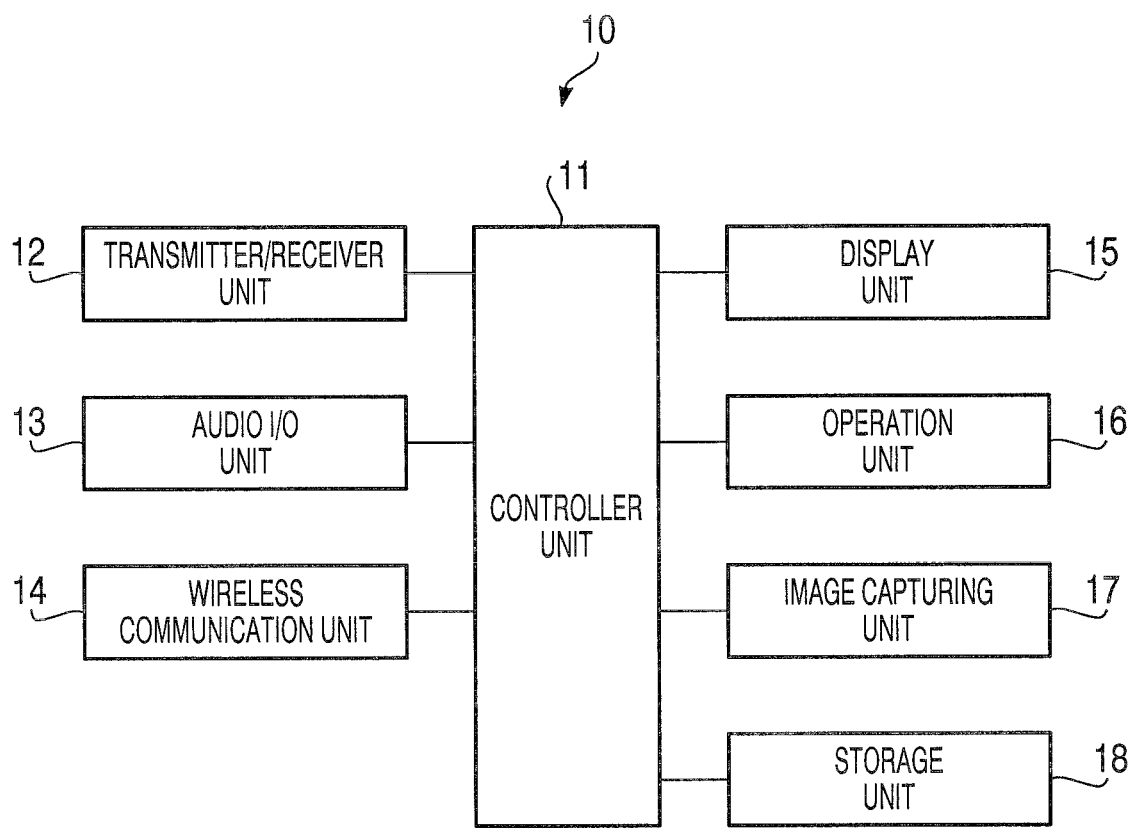
FIG. 2 is a block diagram to illustrate an electrical configuration of the mobile phone according to the embodiment of the present invention.

Next, an electrical configuration of the mobile phone 10 will be described with reference to FIG. 2. The mobile phone 10 includes a controller unit 11, a transmitter/receiver unit 12, an audio I/O unit 13, a wireless communication unit 14, a display unit 15, an operation unit 16, an image capturing unit 17, and a storage unit 18.

The controller unit 11 includes an application processor, a ROM, and a RAM, which are not shown in the drawings. The application processor executes programs stored in the ROM and the storage unit 18 to control behaviors of the mobile phone 10. The ROM stores the programs to be executed by the application processor and data to be used in the programs. The RAM provides a work area for the application processor executing the programs.

The transmitter/receiver unit 12 includes an antenna, a radio frequency circuit, and a baseband processor, which are not shown in the drawings. The transmitter/receiver unit 12 exchanges audio signals with the base station 50 via the antenna. Further, the transmitter/receiver unit 12 can exchange data packets with the base station in the telephone-network communication.

The audio I/O unit 13 includes a microphone, a speaker, and a sound processing circuit, which are not shown in the drawings. Sound inputted through the microphone is converted into audio signals, and the audio signals are transmitted to the base station 50 by the transmitter/receiver unit 12. Audio signals received from the base station 50 in the transmitter/receiver unit 12 are converted into sound and outputted through the speaker.

The wireless communication unit 14 enables the in-area communication between the mobile phone 10 and the printer 20 in the specific coverage area. In particular, whilst the mobile phone 10 is wirelessly connected to a communication network 31 via a connection point, such as a wireless LAN router 30 (see FIG. 1), the mobile phone 10 and the printer 20 can communicate with each other in an infrastructure mode. According to the present embodiment, however, the devices in the specific coverage area may not necessarily communicate in the infrastructure mode but directly communicate with each other in an ad-hoc mode without being relayed by the wireless LAN router 30.

The display unit 15 includes a display device (e.g., a liquid crystal display and an organic EL display) and a driving circuit to drive the display device, which are not shown in the drawings.

The operation unit 16 includes a touch-sensitive panel, which is arranged on a surface of the display device to detect a user's input, a controller to control operations in the touch-sensitive panel, and buttons to be pressed by the user, which are not shown in the drawings. The user may use the operation unit 16 to input information (e.g., a telephone number) and manipulate the operations in the mobile phone 10.

The image capturing unit 17 includes an area-image sensor, an optical system, an analog front-end unit, and an image processor, which are not shown in the drawings. The image capturing unit 17 captures an image and generates a digital image based on the captured image. The digital image may be stored in the storage unit 18 and/or transmitted to an external device by the transmitter/receiver unit 12.

The storage unit 18 is a non-volatile memory, such as a flash memory, and stores programs to be executed in the mobile phone 10 and information to be used in the programs. The storage unit 18 may store, for example, an operating system (OS) of the mobile phone 10, a communication controlling program, which will be described below, application programs to be executed in the mobile phone 10, and data to be used in the application programs.

Figure 3:
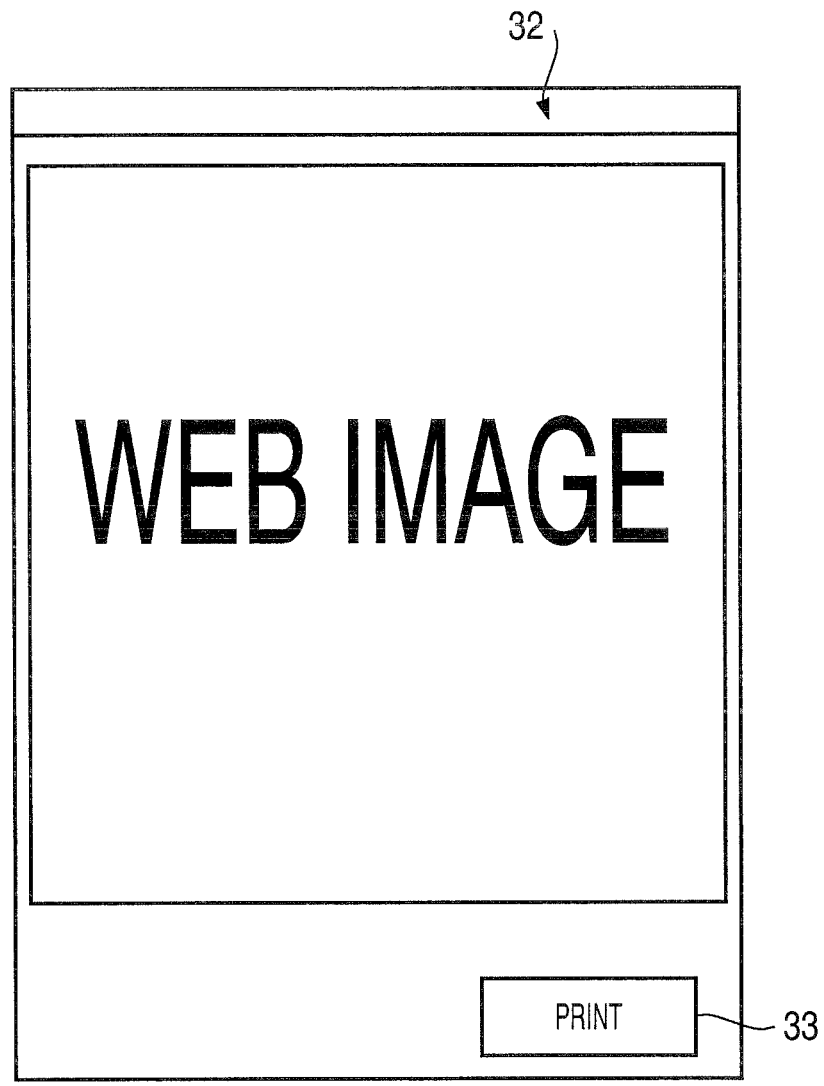
FIG. 3 is an illustrative view of a web-browser screen to be displayed in the mobile phone to communicate with a printer in the communication system according to the embodiment of the present invention.

Next, the communication controlling program to be run in the mobile phone 10 will be described with reference to FIGS. 3-5. The communication controlling program is a printing application program and controls the mobile phone 10 to convert source data into a printable format to be processed by the printer 20 and transmit the print data to the printer 20. Further, whilst the mobile phone 10 is set to communicate in either one of the in-area communication and the telephone-network communication, the communication controlling program can manipulate the controller unit 11 of the mobile phone 10 to switch the communication method to the other of the in-area communication and the telephone-network communication. In the present embodiment, the mobile phone 10 communicates with the printer 20 in the in-area communication method.

Therefore, in the present embodiment, the mobile phone 10 having been set to communicate in the telephone-network communication in advance is switched to communicate in the in-area communication in a communication controlling flow (see FIG. 4) when the mobile phone 10 transmits the print data to the printer 20.

Before switching the communication settings, for example, the user may operate the mobile phone 10 to access the web server 40 in the telephone-network communication to obtain a web image through a web browser of the mobile phone 10. More specifically, when the user accesses the web server 40, a web-browser screen 32 (see FIG. 3) including the web image is displayed in the display device of the display unit 15. Alternatively, the web-browsing function may be provided to the communication controlling program, and the user may activate the web browser within the communication controlling program.

The web-browser screen 32 displayed in the display unit 15 includes a print button 33, which is to be pressed by the user when the user enters an instruction to print the web image appearing in the web-browser screen 32 through the mobile phone 10. More specifically, when the user handles the operation unit 16 to press the print button 33 in the web-browser screen 32, the print instruction is entered, and the controller unit 11 creates print data (e.g., PDL data) based on the web image appearing in the web-browser screen 32. When the print data is created, the communication controlling flow is activated in the mobile phone 10 to transmit the created print data in the in-area communication.

As the communication controlling flow is activated, in S1, the controller unit 11 determines as to whether the mobile phone 10 has been set to communicate in the telephone-network communication prior to starting the in-area communication. The determination can be made, for example, by referring to configuration information stored in the storage unit 18. In this regard, in order to be determined that the mobile phone 10 is set to communicate in the telephone-network communication, the transmitter/receiver unit 12 may not necessarily be accessing the web server 40. Rather, it may be preferable to determine that the mobile phone 10 is set to communicate in the telephone-network communication not only when the transmitter/receiver unit 12 is actually accessing the web server 40 but also is accessible to the web server 40.

For example, after the web-browser screen 32 is obtained in the mobile phone 10, the user may handle the mobile phone 10 in predetermined procedure to release the mobile phone 10 from the telephone-network communication with the web-browser screen 32 maintained in the display unit 15. Thus, when the user presses the print button 33 in the web-browser screen 32 being maintained in the display unit 15 whilst the mobile phone 10 is released from the telephone-network communication, the controller unit 11 determines that the mobile phone 10 is not set to communicate in the telephone-network communication (S1: NO). The flow proceeds to S7. In S7, the controller unit 11 sets the communication method of the mobile phone 10 to the in-area communication, and in S6, the controller unit 11 transmits the created print data to the printer 20 via the communication network 31. The flow ends thereafter. The printer 20 receiving the print data executes a printing operation according to the print data to print the web image on, for example, a sheet of paper.

Meanwhile, after the web-browser screen 32 is obtained in the mobile phone 10, and when the user presses the print button 33 in the web-browser screen 32 without releasing the mobile phone 10 from the telephone-network communication, in S1, the controller unit 11 determines that the mobile phone 10 is set to communicate in the telephone-network communication (S1: YES), and the flow proceeds to S2. In S2, the controller unit 11 observes behaviors of the mobile phone 10, specifically the transmitter/receiver unit 12, to judge as to whether the mobile phone 10 is under a communication session in the telephone-network communication with an external device (e.g., the web server 40).

The communication session in the present embodiment refers to a series of operations, behaviors, and interaction between a plurality of communication-enabled devices within a computer system or a communication network. The communication session may start when one of the communication-enabled devices attempts to establish connection (e.g., logs in) and end when the connection is discontinued (e.g., logouts). If a communication session in telephone-network communication in progress is interrupted by switching of the communication methods, a new communication session in the in-area communication is initiated. In this regard, the former communication session in the telephone-network communication is aborted and cannot be resumed even after the latter communication session in the in-area communication is terminated. For example, during a communication session according to a protocol for exchanging encrypted data via the Internet, such as Secure Socket Layer (SSL), a user may be required to enter information to be encrypted (e.g., personal data, a password, etc.) in the mobile device through a web page. Whilst the user is entering the information, if the communication settings in the mobile device are switched from one to another, the ongoing (preceding) communication session is interrupted and aborted, and a new communication session is activated. However, when the newly activated communication session is terminated, the user's information entered during the former communication session may have been cleared, and the former communication session having been aborted cannot be resumed.

Therefore, in S2, when the controller unit 11 determines that the mobile phone 10 is under a communication session in the telephone-network communication (S2: YES), in S3, the controller unit 11 maintains the ongoing communication session in the telephone-network communication and manipulates the display unit 15 to display an alert dialogue 34 (see FIG. 5). The alert dialogue 34 includes a message, which allows the user to select as to whether the ongoing communication should be interrupted. For example, a message "A communication session is in progress. Continuing the printing operation may disrupt oncoming communication with the web server. Do you wish to continue the printing operation?" may be presented. The alert dialogue 34 further includes an OK button 35 and a cancel button 36. When the user wishes to maintain the ongoing communication session rather than to continue the printing operation, the user manipulates the operation unit 16 to press the cancel button 35. In S4, therefore, the controller unit 11 detects no instruction to interrupt the ongoing communication session being entered (S4: NO). Thus, the communication setting in the mobile phone 10 is maintained unchanged, and the ongoing communication session in the telephone-network communication is maintained. Meanwhile, the print data including the web image is not transmitted. The communication controlling flow ends thereafter.

In S1, if the controller unit 11 determines that the mobile phone 10 is set to communicate in the telephone-network communication (S1: YES), but the mobile phone 10 is not under a communication session in the telephone-network communication (S2: NO), the flow proceeds to S5. In S5, the controller unit 11 switches the communication settings from the telephone-network communication to the in-area communication.

In S2, if the mobile phone 10 is under a communication session in the telephone-network communication (S2: YES), and if the user presses the OK button 36 through the operation unit 16, in S4, the controller unit 11 detects an instruction to interrupt the ongoing (preceding) communication session being entered (S4: YES). The flow proceeds to S5, in which the controller unit 11 interrupts the ongoing communication session in the telephone-network communication and switches the communication settings from the telephone-network communication to the in-area communication.

The flow proceeds to S6. In S6, the controller unit 11 manipulates the transmitter/receiver unit 12 to transmit the print data representing the image in the web-browser screen 32 to the printer 20. The flow ends after the transmission. Accordingly, whilst the preceding communication session in the telephone-network communication is aborted, the image in the web-browser screen 32 obtained in the preceding communication session can be printed in the printer 20.

According to the behaviors of the controller unit 11 in the mobile phone 10, the controller unit 11 determines as to whether the mobile phone 10 is under a communication session in the telephone-network communication prior to initiating a new communication session in the in-area communication. The communication settings are switched from the telephone-network communication to the in-area communication when the controller unit 11 determines that the mobile phone 10 is not under a communication session in the telephone-network communication. Therefore, undesirable termination of the ongoing communication session in the telephone-network communication upon switching the communication settings can be effectively prevented.

Further, even when the controller unit 11 determines that the mobile phone 10 is under a communication session in the telephone-network communication, the communication settings can be switched from the telephone-network communication to the in-area communication based on detection of the instruction to interrupt the ongoing communication session, that is, the user's preference. Therefore, unintended termination of the ongoing communication session in the telephone-network communication regardless of the user's preference can be effectively prevented.

Figure 6:
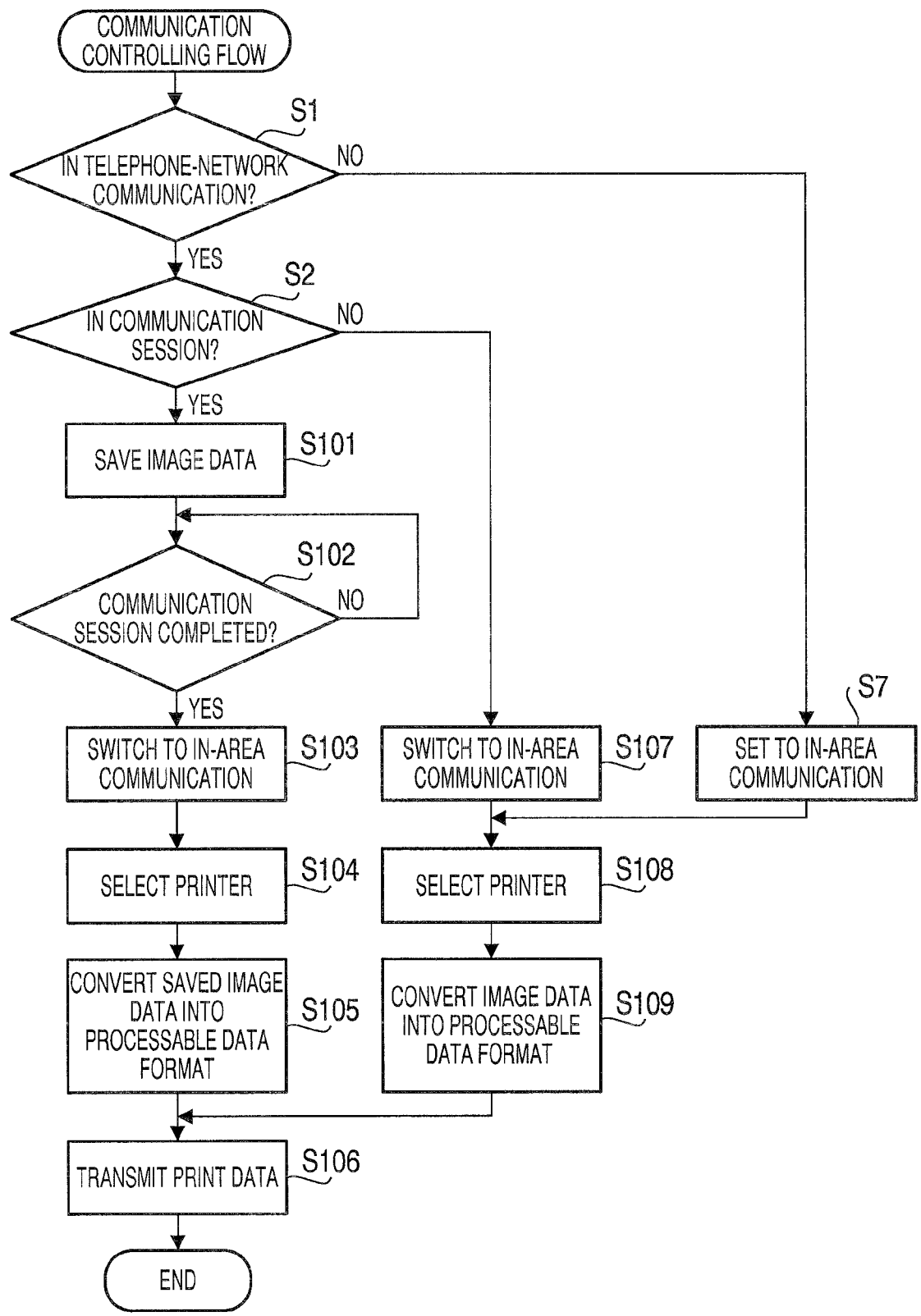
FIG. 6 is a flowchart to illustrate a communication controlling flow to run in the mobile phone according to a second embodiment of the present invention.

Next, the second embodiment of the present invention will be described with reference to FIGS. 6 and 7. A communication system 1 in the second embodiment is configured similarly to the communication system 1 in the first embodiment. However, the behaviors of the controller unit 11 in the communication controlling flow to be activated in the mobile phone 10 are partly different from those of the controller unit 11 in the first embodiment. The following description focuses on the different behaviors of the controller unit 11, and description of the similar behaviors is omitted. Additionally, in the second embodiment, the communication system 1 includes a plurality of printers (not shown) including the printer 20 within the communication network 31, and the mobile phone 10 is enabled to communicate with each of the printers in the in-area communication.

When the communication controlling flow (see FIG. 6) is activated, and when the controller unit 11 determines that the mobile phone 10 is under a communication session in the telephone-network communication (S1: YES, S2: YES), the flow proceeds to S101. In S101, the controller unit 11 maintains the ongoing communication session in the telephone-network communication and stores to save image data representing the image in the web-browser screen 32 in the storage unit 18.

As mentioned above, the communication network 31 includes a plurality of printers. According to the present embodiment, each of printers in the communication network 31 supports a different printable data format depending on a type of the printer. For example, when models of the printers are different from one other, printer languages to be interpreted by the respective printers are different from one another. Therefore, a data format processable in one of the printers may be different from a data format processable in another one of the printers. In this regard, the information concerning the processable data formats is obtainable to the mobile phone 10 when the mobile phone 10 is set to communicate in the in-area communication. In other words, the information concerning the processable data formats cannot be obtained when the mobile phone 10 is set to communicate in the telephone-network communication. Therefore, in S101, the controller unit 11 stores the image data in a common data format, which is convertible into a plurality of data formats to be processed by any or most of the plurality of printers. Thus, the image data to be transmitted to the printer 20 can be stored initially in the common data format and later converted into the specific data format processable for the selected printer 20 amongst the plurality of printers after switching of the communication settings in the mobile phone 10. The flow proceeds to S102.

In S102, the controller unit 11 judges as to whether the ongoing (preceding) communication session is completed. The controller unit 11 may determine that the preceding communication is completed when, for example, no user's input has been detected for a predetermined period of time or a predetermined input indicating the completion of the preceding communication session is detected. When the preceding communication is completed (S102: YES), in S103, the controller unit 11 switches the communication settings in the mobile phone 10 from the telephone-network communication to the in-area communication. Therefore, it can be prevented that a new communication session is unnecessarily kept suspended from being activated after completion of the preceding communication session in the telephone-network communication. The flow proceeds to S104.

In S104, the controller unit 11 allows the user to select a printer to be used in the current in-area communication. More specifically, the controller unit 11 displays a printer selectable screen 37 (see FIG. 7), which shows options of available printers with radio buttons 38A, 38B, 38C, in the display unit 15. The options of available printers shown in the printer selectable screen 37 include one or more available printers, including the printer 20 (see FIG. 1), which can communicate with the mobile phone 10 in the in-area communication. The controller unit 11 obtains information concerning the available printers (e.g., printer names, IP addresses, etc.) via the communication network 31 in the in-area communication after the communication settings were switched from the telephone-network communication to the in-area communication in S103.

In S104, when the user handles the operation unit 16 to press to select one of the radio buttons 38A-38C and press an OK button 36, the controller unit 11 reserves the selected printer (e.g., the printer 20) in the storage unit 18. In S104, alternatively, upon selection of the printer, the controller unit 11 may obtain information concerning locations of the available printers and automatically select one of the available printers being in a nearest location from the mobile phone 10. The automatically selected printer may be informed to the user through the display unit 15. The flow proceeds to S105.

In S105, the controller unit 11 converts the image data stored in the storage unit 18 being in the common data format into print data processable for the printer 20 selected in S104. In S106, the controller unit 11 transmits the converted print data to the printer 20, and the flow ends thereafter. Thus, according to the flow in S102-S106, the printing operation, which is based on the in-area communication, requested by the user but suspended due to the ongoing (preceding) communication session in the telephone-network communication, can be conducted after completion of the preceding communication session. Further, the image can be printed in any one of the printers within the communication network 31 according to the user's preference or according to automatic selection by the controller unit 11.

In S2, meanwhile, when the mobile phone 10 is not under a communication session in the telephone-network communication (S2: NO), in S107, the controller unit 11 switches the communication settings in the mobile phone 10 from the telephone-network communication to the in-area communication. The flow proceeds to S108. In S108, similarly to S104, the controller unit 11 allows the user to select a printer to be used in the current in-area communication. In S109, the controller unit 11 converts the image data into a data format processable for the printer 20 selected in S108. The flow proceeds to S106, in which the controller unit 11 transmits the converted print data to the printer 20. The flow ends thereafter.

Although an examples of carrying out the invention have been described, those skilled in the art will appreciate that there are numerous variations and permutations of the communication controlling method and the communication device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the mobile phone 10 may be replaced with any communication-enabled device, as long as the communication device is capable of communicating in a plurality of different communication settings, such as a mobile computer, a desktop computer, an internet printer or an internet facsimile having a communication function.

For another example, the printer 20 may be replaced with any external device, which can communicate with the mobile phone 10, such as a facsimile machine, a display device, an output device (e.g., a projector), and an input device (e.g., a scanner, a camera, etc.). In particular, for example, when a user creates a web page using a computer, which is accessing the web server 40 in telephone-network communication (e.g., the Internet) and is connectable with a scanner in in-area network, the computer may effectively switch the communication settings from the telephone-network to the in-area network in order to obtain an image to be included in the web page from the scanner.

In the embodiment of the present invention, the mobile phone 10 is wirelessly connected with the printer 20 in the in-area communication and with the web server 40 in the telephone-network communication. However, at least one of the connections may be replaced with wired communication as long as the plurality of communication settings are different from each other, and the mobile phone 10 is not capable of establishing parallel connections with the external devices in the plurality of different communication settings simultaneously. Further, a number of the plurality of different communication settings may be three or more.

In the embodiments of the present invention, even during a communication session in the telephone-network communication (S2: YES), the communication settings are switched from the telephone-network communication to the in-area communication when the user allows interruption in the ongoing communication session (S4: YES). However, the communication settings may not necessarily be switched based on entry of the user's instruction. Rather, the ongoing (preceding) communication session in the telephone-network communication may be maintained. The communication settings may be switched to the in-area communication automatically after completion of the preceding communication.

In the second embodiment described above, the printer 20 to be used for the image may not necessarily be selected after S103 but may have been set to be used in advance either manually or automatically. In this configuration, the image data representing the image to be printed may be converted into the data format processable for the preset printer 20 to crerate the print data concurrently in parallel with the ongoing (preceding) communication session. The converted print data may be transmitted to the printer 20 when the communication settings are switched from the telephone-network communication to the in-area communication. Thus, the print data can be output to the immediately a printer 20 immediately after completion of the preceding communication session.

Figure 4:
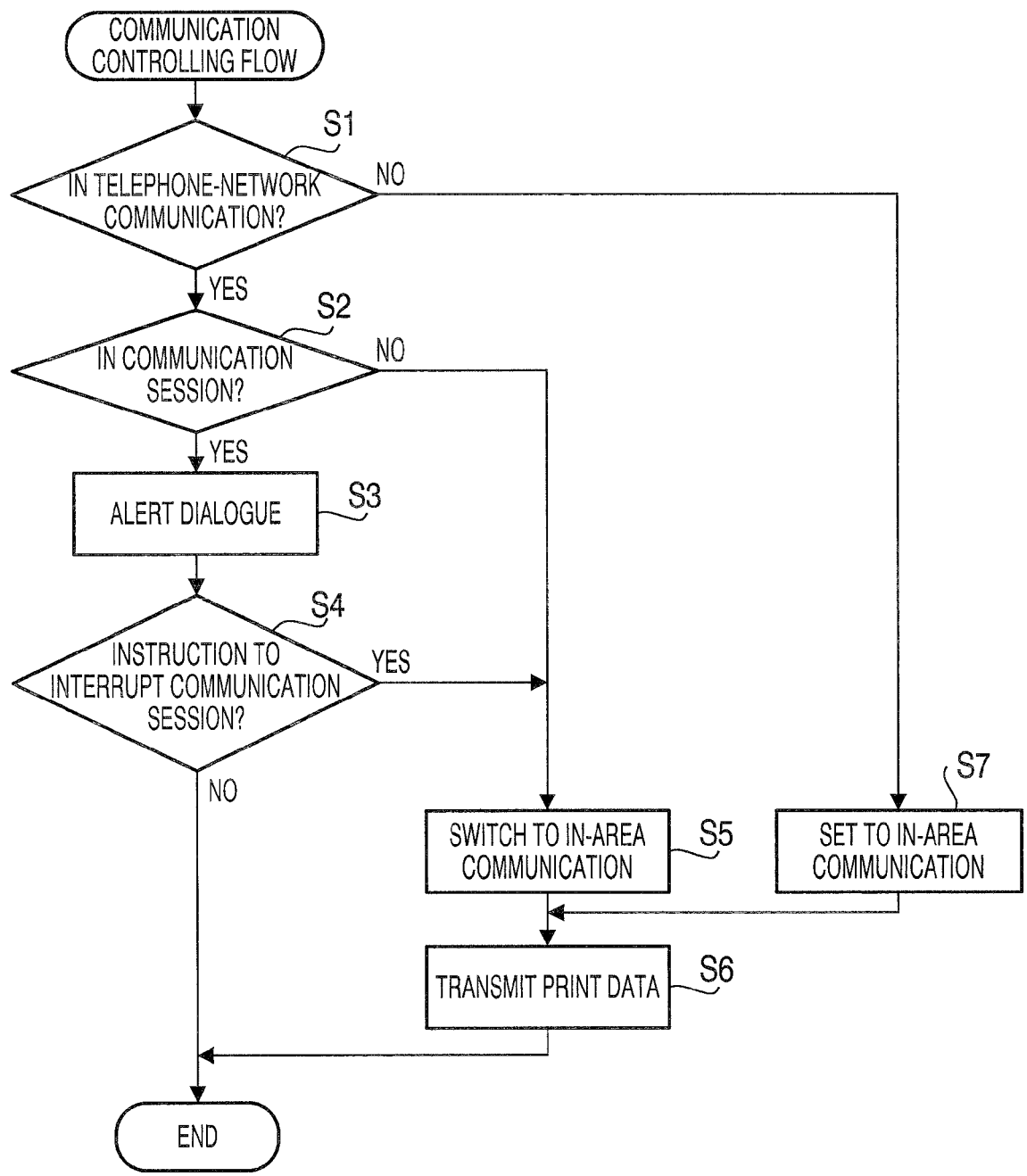
FIG. 4 is a flowchart to illustrate a communication controlling flow to run in the mobile phone according to the embodiment of the present invention.
Figure 5:
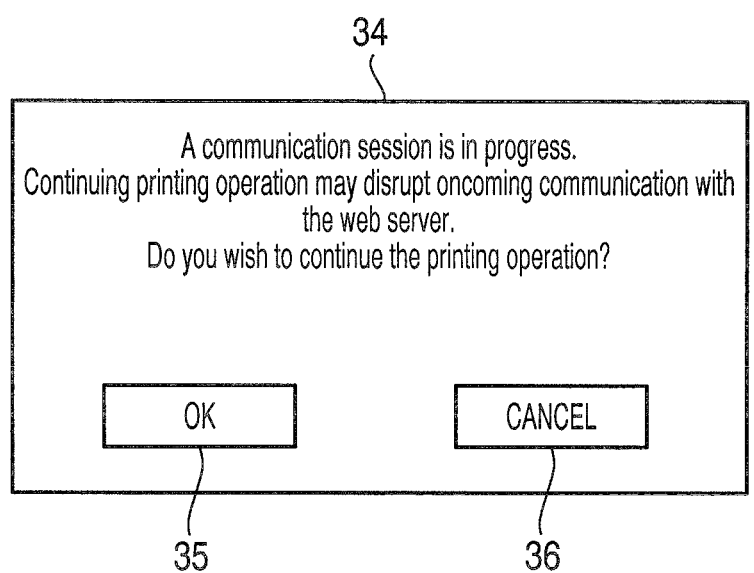
FIG. 5 is an illustrative view of an alert dialogue to be displayed in the mobile phone according to the embodiment of the present invention.
Figure 7:
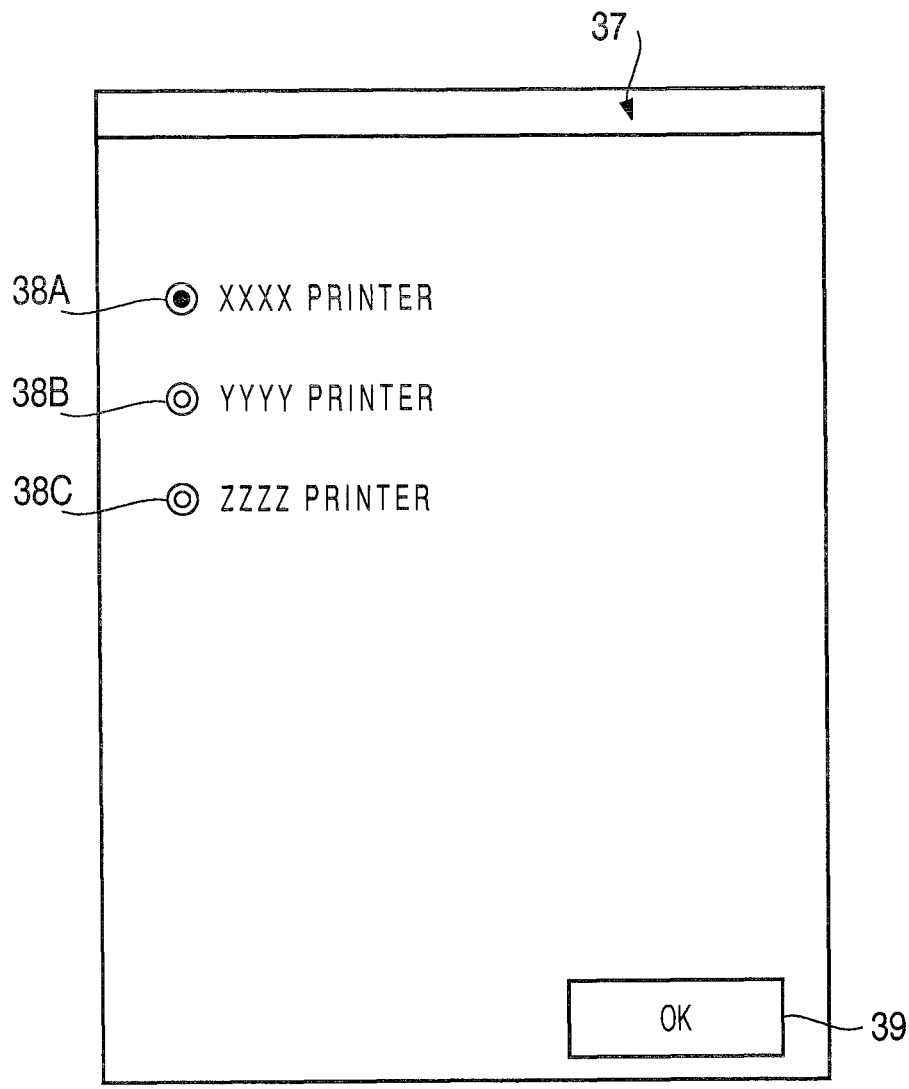
FIG. 7 is an illustrative view of a printer selectable screen to be displayed in the mobile phone according to the embodiment of the present invention.

For another example, the steps in the communication controlling flow, the access-point determining flow, and the print data transmitting flow shown in FIGS. 4, 5, and 7 may not necessarily be executed by a single application processes, i.e., the controller unit 11, but at least a part of the steps may be executed by a different application processor or a dedicated processing circuit (e.g., ASIC).

What is claimed is:

1. A method to control a communication device to communicate with a first external device, the first external device being a printing device in an in-area communication method configured to communicate with network-enabled devices exclusively within a specific coverage area, and with a second external device in a telephone-network communication method configured to communicate with a device outside the specific coverage area using a telephone-network communication method, comprising steps of:

determining prior to communicating in the in-area communication method whether the communication device is under an ongoing communication session in the telephone-network communication method;

when it is determined that the communication device is not under any ongoing communication session in the telephone-network communication method, switching the communication methods in the communication device from the telephone-network communication method to the in-area communication method;

when it is determined that the communication device is under an ongoing communication session, maintaining the telephone-network communication method set in the communication device until the ongoing communication session is completed and switching the communication methods in the communication device from the telephone-network communication method to the in-area communication method after the completion of the ongoing communication session; and communicating with the first external device in the in-area communication method after switching the communication methods from the telephone-network communication method to the in-area communication method.

2. The method according to claim 1, further comprising a step of:

detecting whether an interrupter instruction, which is an instruction for the communication device to interrupt the ongoing communication with the second external device in the telephone-network communication method, is inputted by a user of the communication device when it is determined that the communication device is under the ongoing communication session, wherein, in the step of switching and the step of maintaining and switching, the communication method in the communication device is switched from the second telephone-network communication method to the in-area communication method if the interrupter instruction is detected in the step of detecting even when it is determined that the communication device is under the ongoing communication session.

3. The method according to claim 1, further comprising a step of:

storing data, which is to be transmitted in the step of communicating to the first external device in the in-area communication method, in a storage unit in the communication device when the ongoing communication in the telephone-network communication method is maintained, wherein, in the step of communicating, the data stored in the storage unit is transmitted to the first external device after switching the communication methods from the telephone-network communication method to the in-area communication method.

4. The method according to claim 3, wherein, in the step of storing, the data to be transmitted to the first external device is stored in the storage unit in a common data format, which is convertible into a plurality of data formats to be processable for a plurality of types of first external devices; and wherein, in the step of communicating, the data in the common data format stored in the storage unit is converted into one of the processable data formats to be processed by one of the plurality of types of first external devices, and the converted data is transmitted to the first external device after switching the communication methods in the communication device from the telephone-network communication method to the in-area communication method.

5. The method according to claim 1, further comprising a step of:

creating the data, which is to be transmitted to the first external device in the step of communicating, in the data format processable to the first external device whilst the ongoing communication session in the telephone-network communication method is maintained in the step of maintaining, wherein, in the step of communicating, the created date is transmitted to the first external device after switching the communication methods from the telephone-network communication method to the in-area communication method.

6. A non-transitory computer readable medium storing computer readable instructions to control a communication device, which is capable of communicating with a first external device, the first external device being a printing device in an in-area communication method configured to communicate with network-enabled devices exclusively within a specific coverage area, and with a second external device in a telephone-network communication method configured to communicate with a device outside the specific coverage area using a telephone-network communication method, comprising steps of:

determining prior to communicating in the in-area communication method whether the communication device is under an ongoing communication session in the telephone-network communication method;

when it is determined that the communication device is not under any ongoing communication session in the telephone-network communication method, switching the communication methods in the communication device from the telephone-network communication method to the in-area communication method;

when it is determined that the communication device is under an ongoing communication session, maintaining the telephone-network communication method set in the communication device until the ongoing communication session is completed and switching the communication methods in the communication device from the telephone-network communication method to the in-area communication method after the completion of the ongoing communication session; and communicating with the first external device in the in-area communication method after switching the communication methods from the telephone-network communication method to the in-area communication method.

7. A communication device, which is capable of communicating with a first external device, the first external device being a printing device in an in-area communication method configured to communicate with network-enabled devices exclusively within a specific coverage area, and with a second external device in a telephone-network communication method configured to communicate with a device outside the specific coverage area using a telephone-network communication method, comprising:

a determining unit, which is configured to determine prior to communicating in the in-area communication method whether the communication device is under an ongoing communication session in the telephone-network communication method;

an executing unit, which is configured to switch the communication methods in the communication device from the telephone-network communication method to the in-area communication method when it is determined that the communication device is not under any ongoing communication session in the telephone-network communication method, and configured to maintain the telephone-network communication method set in the communication device when it is determined that the communication device is under an ongoing communication session and switch the communication methods in the communication device from the telephone-network communication method to the in-area communication method after completion of the ongoing communication session; and a communicating unit, which is configured to communicate with the first external device in the in-area communication method after switching the communication methods from the telephone-network communication method to the in-area communication method.

\* \* \* \* \*